(12) United States Patent
Kumar et al.

(10) Patent No.: US 10,732,986 B2
(45) Date of Patent: *Aug. 4, 2020

(54) COMPUTING PLATFORM WITH INTERFACE BASED ERROR INJECTION

(71) Applicant: Intel Corporation, Santa Clara, CA (US)

(72) Inventors: Mohan Kumar, Aloha, OR (US); Sarathy Jayakumar, Portland, OR (US); Jose Andy Vargas, Rescue, CA (US)

(73) Assignee: Intel Corporation, Santa Clara, CA (US)

( * ) Notice: Subject to any disclaimer, the term of this patent is extended or adjusted under 35 U.S.C. 154(b) by 382 days.

This patent is subject to a terminal disclaimer.

(21) Appl. No.: 15/403,006

(22) Filed: Jan. 10, 2017

(65) Prior Publication Data

US 2017/0147484 A1    May 25, 2017

Related U.S. Application Data

(63) Continuation of application No. 13/977,625, filed as application No. PCT/US2012/066402 on Nov. 21, 2012, now Pat. No. 9,594,570.

(Continued)

(51) Int. Cl.
  *G06F 11/00* (2006.01)
  *G06F 9/4401* (2018.01)
  (Continued)

(52) U.S. Cl.
  CPC .............. *G06F 9/4403* (2013.01); *G06F 1/26* (2013.01); *G06F 1/28* (2013.01); *G06F 1/3203* (2013.01);
  (Continued)

(58) Field of Classification Search
  CPC .................. G06F 11/3466; G06F 11/3672
  See application file for complete search history.

(56) References Cited

U.S. PATENT DOCUMENTS 6,990,576 B2 * 1/2006 Qureshi ............... G06F 9/4411
                                                    713/1
7,426,662 B2    9/2008 Sekiguchi et al.
(Continued)

FOREIGN PATENT DOCUMENTS

JP     2004355620     12/2004
JP     2006040284      2/2006
(Continued)

OTHER PUBLICATIONS

Advanced Configuration and Power Interface Specification Version 5.0, Published Dec. 6, 2011, pp. 635-670. (Year: 2011).*

(Continued)

*Primary Examiner* — Elmira Mehrmanesh

(74) *Attorney, Agent, or Firm* — Green, Howard & Mughal, LLP

(57) ABSTRACT

Described is a computing platform, which comprises: a non-volatile memory having a firmware boot program; and a CPU to execute the firmware boot program when the CPU is reset, the firmware boot program including instructions to create Power and Performance Measurement (PPM) interface data structures including an error injection table structure to provide error injection services to an OS.

25 Claims, 9 Drawing Sheets

Related U.S. Application Data

(60) Provisional application No. 61/563,030, filed on Nov. 22, 2011.

(51) Int. Cl.

| | | |
|---|---|---|
| *G06F 16/22* | (2019.01) | |
| *G06F 1/3203* | (2019.01) | |
| *G06F 1/324* | (2019.01) | |
| *G06F 1/3296* | (2019.01) | |
| *G06F 9/44* | (2018.01) | |
| *G06F 9/445* | (2018.01) | |
| *G06F 1/28* | (2006.01) | |
| *G06F 1/3234* | (2019.01) | |
| *G06F 11/36* | (2006.01) | |
| *G06F 1/26* | (2006.01) | |
| *G06F 9/22* | (2006.01) | |
| *G06F 11/30* | (2006.01) | |
| *G06F 11/34* | (2006.01) | |
| *G06F 9/30* | (2018.01) | |
| *G06F 1/20* | (2006.01) | |
| *G06F 15/78* | (2006.01) | |
| *G06F 1/32* | (2019.01) | |
| *G06F 9/38* | (2018.01) | |
| *G06F 119/06* | (2020.01) | |

(52) U.S. Cl.
CPC ............ *G06F 1/324* (2013.01); *G06F 1/3234* (2013.01); *G06F 1/3275* (2013.01); *G06F 1/3296* (2013.01); *G06F 9/22* (2013.01); *G06F 9/44* (2013.01); *G06F 9/4401* (2013.01); *G06F 9/445* (2013.01); *G06F 9/4418* (2013.01); *G06F 11/3024* (2013.01); *G06F 11/3409* (2013.01); *G06F 11/3664* (2013.01); *G06F 11/3672* (2013.01); *G06F 11/3688* (2013.01); *G06F 16/2282* (2019.01); *G06F 1/206* (2013.01); *G06F 1/32* (2013.01); *G06F 9/3012* (2013.01); *G06F 9/30098* (2013.01); *G06F 9/384* (2013.01); *G06F 11/3447* (2013.01); *G06F 11/3466* (2013.01); *G06F 15/7871* (2013.01); *G06F 2119/06* (2020.01); *G06F 2209/501* (2013.01); *Y02D 10/126* (2018.01); *Y02D 10/172* (2018.01)

(56) References Cited

U.S. PATENT DOCUMENTS

| | | | |
|---|---|---|---|
| 8,448,024 B2 | 5/2013 | Kumar et al. | |
| 8,468,397 B2 | 6/2013 | Yamazaki | |
| 8,645,797 B2 | 2/2014 | Yigzaw et al. | |
| 9,594,570 B2* | 3/2017 | Kumar | G06F 17/30339 |
| 2004/0243534 A1 | 12/2004 | Culter et al. | |
| 2006/0036816 A1 | 2/2006 | McMahan et al. | |
| 2007/0043965 A1 | 2/2007 | Mandelblat et al. | |
| 2008/0046546 A1 | 2/2008 | Parmar et al. | |
| 2008/0148033 A1* | 6/2008 | Sumner | G06F 8/31 713/1 |
| 2010/0235834 A1* | 9/2010 | Faasse | G06F 1/3203 718/1 |
| 2011/0231682 A1* | 9/2011 | Kakish | G06F 1/1632 713/320 |

FOREIGN PATENT DOCUMENTS

| | | |
|---|---|---|
| JP | 2009-505306 | 2/2009 |
| KR | 1020080016505 | 2/2008 |
| WO | 2013078418 | 5/2013 |

OTHER PUBLICATIONS

ACPI (Advanced Configuration and Power Interface), Specification 4.0a, published on Apr. 5, 2010 (Year: 2010).*
Notice of Allowance for Korean Patent Application No. 2017-7001971 dated Apr. 24, 2017, 4 pages.
ACPI (Advanced Configuration and Power Interface), Specification 4.0a, Section 17, published on Apr. 5, 2010, pp. 503-535.
Advisory Action for U.S. Appl. No. 13/977,625 dated Dec. 23, 2015, 2 pages.
Final Notice of Preliminary Rejection for Korean Patent Application No. 2014-7013589, dated Jun. 20, 2016, 8 pages.
Final Office Action for U.S. Appl. No. 13/977,625 dated Aug. 12, 2016, 15 pages.
Final Office Action for U.S. Appl. No. 13/977,625 dated Oct. 8, 2015, 11 pages.
Final Rejection for Korean Patent Application No. 2014-7013589, dated Mar. 4, 2016.
International Preliminary Report on Patentability received for PCT Patent Application No. PCT/US2012/066402, dated Jun. 5, 2014.
International Search Report received for International Application No. PCT/US2012/066402, dated Mar. 29, 2012, 3 pages.
Korean Office Action dated Aug. 20, 2015 for Korean Patent Application No. 2014-7013589.
Non-Final Office Action for U.S. Appl. No. 13/977,625 dated Apr. 10, 2015, 11 pages.
Non-Final Office Action for U.S. Appl. No. 13/977,625 dated Feb. 1, 2016, 13 pages.
Notice of Allowance for Korean Patent Application No. 2014-7013589 dated Dec. 29, 2016, 3 pages.
Notice of Allowance for U.S. Appl. No. 13/977,625 dated Nov. 3, 2016, 9 pages.
Windows Hardware Error Architecture ACPI Table Specification, white paper, Microsoft Corporation, Nov. 5, 2007, pp. 6-7.
Hewlett-Packard Corporation, "Advanced Configuration and Power Interface Specification", Specification 4.0a, Section 17, pp. 503-535 (published on Apr. 5, 2010).
Notice of Allowance for Korean Patent Application No. 2017-7016297 dated Sep. 13, 2017.

* cited by examiner

| Field | Byte length | Byte offset | Description |
|---|---|---|---|
| ACPI Standard Header | | | |
| Header Signature | 4 | 0 | EINJ. Signature for the Error Record Injection Table. |
| Length | 4 | 4 | Length, in bytes, of entire EINJ. Entire table must be contiguous. |
| Revision | 1 | 8 | 1 |
| Checksum | 1 | 9 | Entire table must sum to zero. |
| OEMID | 6 | 10 | OEM ID. |
| OEM Table ID | 8 | 16 | The manufacturer model ID. |
| OEM Revision | 4 | 24 | OEM revision of EINJ. |
| Creator ID | 4 | 28 | Vendor ID of the utility that created the table. |
| Creator Revision | 4 | 32 | Revision of the utility that created the table. |
| Injection Header | | | |
| Injection Header Size | 4 | 36 | Length in bytes of the injection interface header. |
| Injection Flags | 1 | 40 | Reserved. Must be zero |
| Reserved | 3 | 41 | Must be zero. |
| Injection Entry Count | 4 | 44 | The number of Instruction Entries in the Injection Action Table |
| Injection Action Table | | | |
| Injection Instruction Entries | | 48 | A series of error injection instruction entries |

*FIG. 6*

| Field | Byte length | Byte offset | Description |
|---|---|---|---|
| Injection Action | 1 | N+0 | The injection action that this instruction is a part of. See Table 17-23 for supported injection actions. |
| Instruction | 1 | N+1 | Identifies the instruction to execute. See Table 17-26 for a list of valid instructions. |
| Flags | 1 | N+2 | Flags that qualify the instruction. |
| Reserved | 1 | N+3 | Must be zero. |
| Register Region | 12 | N+4 | Generic address structure as defined in Section 5.2.3.1 to describe the address and bit. Address_Space_ID must be 0 (System Memory) or 1 (System IO). This constraint is an attempt to ensure that the registers are accessible in the presence of hardware error conditions. |
| Value | 8 | N+16 | This is the value field that is used by the instruction READ or WRITE_REGISTER_VALUE. |
| Mask | 8 | N+24 | The bit mask required to obtain the bits corresponding to the injection instruction in a given bit range defined by the register region. |

*FIG. 8*

| Value | Name | Description |
|---|---|---|
| 0x0 | BEGIN_INJECTION_OPERATION | Indicates to the platform that an error injection is beginning. This allows the platform to set its operational context. |
| 0x1 | GET_TRIGGER_ERROR_ACTION_TABLE | Returns a 64-bit physical memory pointer to the TRIGGER_ERROR action table. The TRIGGER_ERROR action instructions when executed by software trigger the error that was injected by the immediately prior SET_ERROR_TYPE action. |
| 0x2 | SET_ERROR_TYPE | Type of error to inject. Only one ERROR_TYPE can be injected at any given time. If there is request for multiple injections at the same time, then the platform will return an error condition. |
| 0x3 | GET_ERROR_TYPE | Returns the error injection capabilities of the platform. |
| 0x4 | END_OPERATION | Indicates to the platform that the current injection operation has ended. This allows the platform to clear its operational context. |
| 0x5 | EXECUTE_OPERATION | Instructs the platform to carry out the current operation based on the current operational context. |
| 0x6 | CHECK_BUSY_STATUS | Returns the state of the current operation. Once an operation has been executed through the EXECUTE_OPERATION action, the platform is required to return an indication that the operation is busy until the operation is completed. This allows software to poll for completion by repeatedly executing the CHECK_BUSY_STATUS action until the platform indicates that the operation is complete by setting not busy. The lower most bit (bit0) of the returned value indicates the busy status by setting it to 1 and not busy status by setting it to 0. |
| 0x7 | GET_COMMAND_STATUS | Returns the status of the current operation. The platform is expected to maintain a status code for each operation. Bits 1:8 of the returned value indicate the command status. See Table 18-288 for a list of valid command status codes. |
| 0x8 | SET_ERROR_TYPE_WITH_ADDRESS | Type of error to inject, and the address to inject. Only one Error type can be injected at any given time. If there is request for multiple injections at the same time, then the platform will return an error condition. Both this Action and the SET_ERROR_TYPE action will be present as part of this EINJ action table. OSPM is free to choose either of these two actions to inject an error. The platform will give precedence to SET_ERROR_TYPE_WITH_ADDRESS. In other words, if a non-zero value is set using SET_ERROR_TYPE_WITH_ADDRESS, then any error type value set by SET_ERROR_TYPE will be ignored. If, on the other hand, no error type is specified using SET_ERROR_TYPE_WITH_ADDRESS, then the platform will use SET_ERROR_TYPE to identify the error type to inject. The RegisterRegion field (See Table 18-300) in SET_ERROR_TYPE_WITH_ADDRESS points to a data structure whose format is defined in Table 18-290. Note that calling set error type with address without specifying address has the same behavior as calling SET_ERROR_TYPE. |
| 0xFF | TRIGGER_ERROR | This is not a true error injection action. In response to error injection, the platform returns a trigger error action table. This table consists of a series of injection instruction entries where the injection action is set to TRIGGER_ERROR to distinguish such entries. |

*FIG. 7*

| Value | Name | Description |
|---|---|---|
| 0x01 | PRESERVE_REGISTER | For WRITE_REGISTER and WRITE_REGISTER_VALUE instructions, this flag indicates that bits within the register that are not being written must be preserved rather than destroyed.<br>For READ_REGISTER instructions, this flag is ignored. |

*FIG. 9*

| Opcode | Instruction name | Description |
|---|---|---|
| 0x00 | READ_REGISTER | A READ_REGISTER instruction reads the value from the specified register region. |
| 0x01 | READ_REGISTER_VALUE | A READ_REGISTER_VALUE instruction reads the designated information from the specified Register Region and compares the results with the contents of the Value field.<br>If the information read matches the contents of the Value field, TRUE is returned, else FALSE is returned. |
| 0x02 | WRITE_REGISTER | A WRITE_REGISTER instruction writes a value to the specified Register Region. The Value field is ignored. |
| 0x03 | WRITE_REGISTER_VALUE | A WRITE_REGISTER_VALUE instruction writes the contents of the Value field to the specified Register Region. |
| 0x04 | NOOP | No operation. |

*FIG. 10*

| Value | Description |
|---|---|
| 0x0 | Success |
| 0x1 | Unknown Failure |
| 0x2 | Invalid Access |

*FIG. 11*

| Bit | Description |
|---|---|
| 0 | Processor Correctable |
| 1 | Processor Uncorrectable non-fatal |
| 2 | Processor Uncorrectable fatal |
| 3 | Memory Correctable |
| 4 | Memory Uncorrectable non-fatal |
| 5 | Memory Uncorrectable fatal |
| 6 | PCI Express Correctable |
| 7 | PCI Express Uncorrectable non-fatal |
| 8 | PCI Express Uncorrectable fatal |
| 9 | Platform Correctable |
| 10 | Platform Uncorrectable non-fatal |
| 11 | Platform Uncorrectable fatal |
| 12:30 | RESERVED |
| 31 | Vendor Defined Error Type. If this bit is set, then the Error types and related data structures are defined by the Vendor, as shown in Table 18-308. |

FIG. 12

| Field | Byte Length | Byte Offset | Description |
|---|---|---|---|
| Error Type | 4 | 0x0 | Bit map of error types to inject. Refer Table 18-304. This field is cleared by the platform once it is consumed. |
| Vendor Error Type Extension Structure Offset | 4 | 4 | Specifies the offset from the beginning of the table to the vendor error type extension structure. If no vendor error type extension is present, bit31 in error type must be clear and this field must be set to 0. |
| Flags | 4 | 0x8 | BIT 0 – Processor APIC Field Valid<br>BIT 1 – Memory Address and Memory address Mask Field Valid<br>BIT 2 – PCIe SBDF field valid<br>BIT3:BIT31 – RESERVED<br><br>This field is cleared by the platform once it is consumed. |
| Processor Error | | | |
| APIC ID | 4 | 0x0C | Optional field which specifies the physical APIC ID or the X2APIC ID of the processor which is a target for the injection. |
| Memory Error | | | |
| Memory Address | 8 | 0x10 | Optional field which specifies the physical address of the memory which is the target for the injection. Valid if BIT 1 of the Flags field is set. |
| Memory Address Range | 8 | 0x18 | Optional field which provides a range mask for the address field. Valid if BIT 1 of the Flags field is set. If the OSPM doesn't want to provide a range of address, then this field should be zero. |
| PCIe SBDF | 4 | 0x20 | BYTE 3 – PCIe Segment<br>BYTE 2 – Bus Number<br>BYTE 1 – Device Number(BITs 7:3), Function Number BITs(2:0)<br>BYTE 0 – RESERVED |

FIG. 13

| Field | Byte Length | Byte Offset | Attribute | Description |
|---|---|---|---|---|
| Length | 4 | 0x0 | Set by software. RO for Platform | |
| SBDF | 4 | 0x04 | Set by Platform. RO for Software | This provides a PCIe Segment, Bus, Device and Function number which can be used to read the Vendor ID, Device ID and Rev ID, so that software can identify the system for error injection purposes.<br>The platform sets this field and is RO for Software |
| Vendor ID | 2 | 0x08 | Set by Platform. RO for Software | Vendor ID which identifies the device manufacturer. This is same as the PCI SIG defined Vendor ID<br>The platform sets this field and is RO for Software |
| Device ID | 2 | 0x0A | Set by Platform. RO for Software | This 16-bit ID is assigned by the manufacturer that identifies this device.<br>The platform sets this field and is RO for Software |
| Rev ID | 1 | 0x0C | Set by Platform. RO for Software | This 8-bit value is assigned by the manufacturer and identifies the revision number of the device.<br>The platform sets this field and is RO for Software |
| Reserved | 3 | 0x0D | Set by Platform. RO for Software | Reserved |
| OEM Defined structure | N | 0x10 | | The rest of the fields are defined by the OEM. |

*FIG. 14*

| TRIGGER_ERROR Header | Byte Length | Byte Offset | Description |
|---|---|---|---|
| Header Size | 4 | 0 | Length in bytes of this header. |
| Revision | 4 | 4 | |
| Table Size | 4 | 8 | Size in Bytes of the entire table. |
| Entry Count | 4 | 12 | The number of Instruction Entries in the TRIGGER_ERROR Action Sequence (See Note 1) |
| Action Table | | | |
| TRIGGER_ERROR Instruction Entries (See Note 2) | | 16 | A series of error injection instruction entries as defined in Table 17-28. |

*FIG. 15*

COMPUTING PLATFORM WITH INTERFACE BASED ERROR INJECTION

This United States continuation patent application is related to, and claims priority to, U.S. patent application Ser. No. 13/977,625 entitled "COMPUTING PLATFORM WITH INTERFACE BASED ERROR INJECTION," filed Jun. 28, 2013, patented on 14 Mar. 2017 as U.S. Pat. No. 9,594,570, which is related to, and claims priority to, International Patent Application No. PCT/US2012/066402 entitled "COMPUTING PLATFORM WITH INTERFACE BASED ERROR INJECTION," filed Nov. 21, 2012, which is related to, and claims priority to, and to U.S. Provisional Patent Application No. 61/563,030 entitled "CPPC, RASF, MPST, FPDT, AND EINJ TECHNOLOGY," filed Nov. 22, 2011, the entire contents of which are all incorporated herein by reference in their entirety.

BACKGROUND

The present invention relates generally to a platform performance management interface. In particular, it pertains to providing error injection services through a performance management interface in a computing platform.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 6 is a table showing the layout of an Error Injection (EINJ) table in accordance with some embodiments.

FIG. 7 shows supported error injection actions in accordance with some embodiments.

FIG. 8 shows the layout of an injection instruction entry in accordance with some embodiments.

FIG. 9 is a table showing instruction flags in accordance with some embodiments.

FIG. 10 lists injection instructions supported for injection instruction entries in accordance with some embodiments.

FIG. 11 defines the error injection status codes returned from GET COMMAND STATUS in accordance with some embodiments.

FIG. 12 lists error type codes returned from GET_ERROR TYPE in accordance with some embodiments.

FIG. 13 is a table showing a GET_ERROR_TYPE_WITH_ADDRESS data structure in accordance with some embodiments.

FIG. 14 is a table showing vendor error type extension structure in accordance with some embodiments.

FIG. 15 is a table showing a trigger error action in accordance with some embodiments.

DETAILED DESCRIPTION

Figure 1:
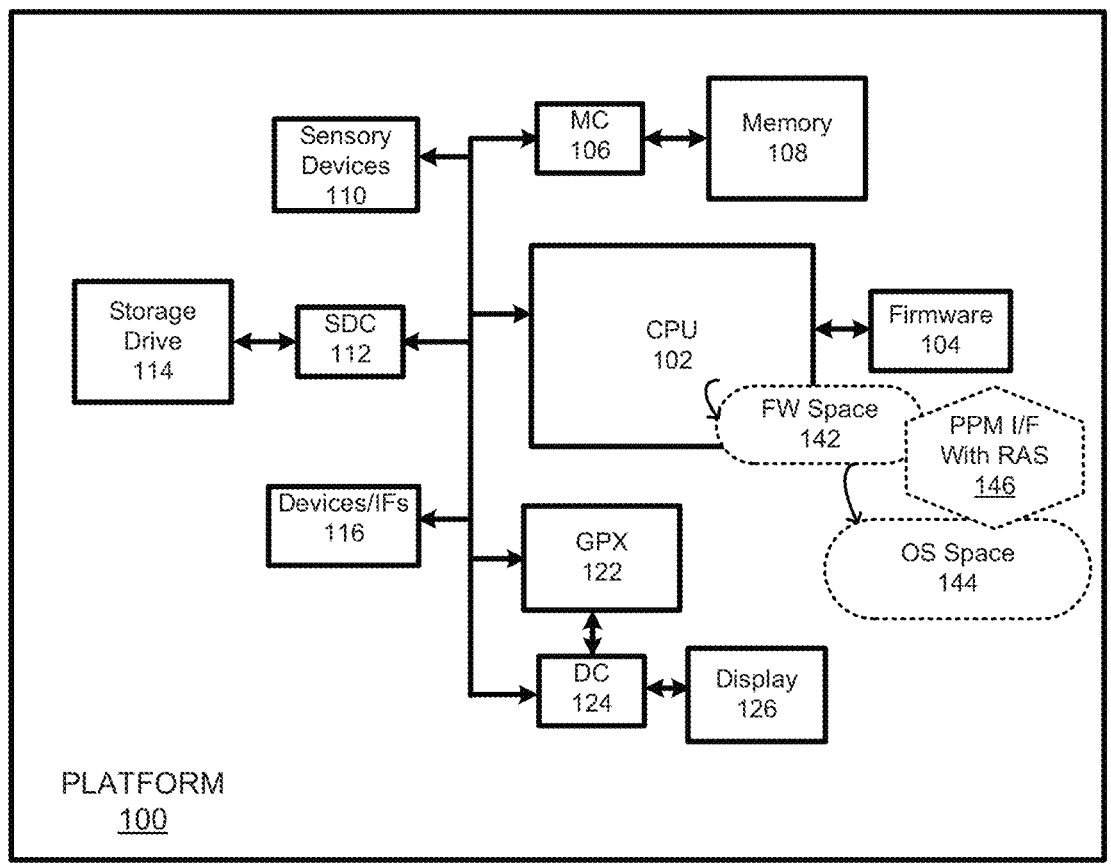
FIG. 1 is a block diagram of a computing platform with error injection support provided through a PPM interface in accordance with some embodiments.

FIG. 1 is a diagram of a portion of a computing platform 100 with a performance and power management (PPM) interface facilitating error injection services in accordance with some embodiments. The computing platform, as generally illustrated in the figure, is intended to represent a variety of different computing platform types including but not limited to servers, desktop PCs, netbooks, ultra-books, tablets, smart-phones, and the like. For simplicity and ease of understanding, details and/or components, not pertinent to this disclosure, for some platform embodiments will have been omitted.

As used herein, the term "PPM" stands for performance and power management and refers to any suitable interface for enabling operating systems, as well as applications through their operating systems, to control, monitor, maintain, etc., hardware components within a platform, as long as the platform and OS, at least with regard to a relevant feature, comply with the PPM interface. An example of a PPM is the Advanced Configuration and Power Interface (ACPI).

The depicted platform comprises a CPU 102, sensory devices 110 (e.g., gyros, speakers, cameras, etc.), other devices/interfaces (e.g., keypad, pointer device, USB ports, PCI ports, wireless Ifs, etc.) 116, and a graphics processor (GPX) 122, coupled together through one or more busses and/or point-to-point interconnects. The platform also includes memory 108 (e.g., DRAM) coupled through a memory controller 106 to at least the CPU 102, and it also includes firmware 104 (e.g., implemented with non-volatile memory such as flash memory) coupled to the CPU 102. The platform additionally includes a display 126 coupled through a display controller 124 to the GPX 122 and/or to the CPU 102. (it should be appreciated that while a single CPU block is shown, the platform may include multiple CPUs and/or processing cores for executing one or more OS threads and for performing various different tasks. However, for simplicity, a single CPU executing an operating system is shown herein.)

The platform further includes a storage drive 114 (e.g., a solid state drive) coupled through a storage drive controller 112 to at least the CPU 102. The storage drive may store data, applications, and one or more operating systems (OS) such as Linux, Windows™, Mac OS™, Android, etc., systems. The firmware 104 includes a BIOS, EFI or other boot/initialization software. (Note that the role of the BIOS has changed over time. For example, in some platforms, the BIOS is being replaced by the more complex EFI (Extensible Firmware Interface), but a BIOS for firmware remains in widespread use. To date, EFI has been supported in Microsoft Windows™ versions supporting GPT, in the Linux kernel 2.6.1 and later, and in Mac OS. However, the distinction between BIOS and EFI is rarely made in terminology by the average computer user, making BIOS a catch-all term for both systems. For simplicity, however, the term "firmware" will be used generally to refer to the BIOS, EFI or alternative boot/initialization code.)

Together, the operating system and firmware include software components to implement a PPM interface 146 for the platform. As abstractly represented in the figure, when the platform starts up, after executing primitive start code, the CPU retrieves and runs the boot software (firmware space 142) and among other things, at that time may establish data structures for the PPM interface 146. Once the firmware space (e.g., BIOS, EFI) has initialized, the OS space 144 is then established as the OS boots within the CPU. At this time, PPM modules within the OS may identify various characteristics of the platform through the PPM interface 146 that is being established.

Figure 2:
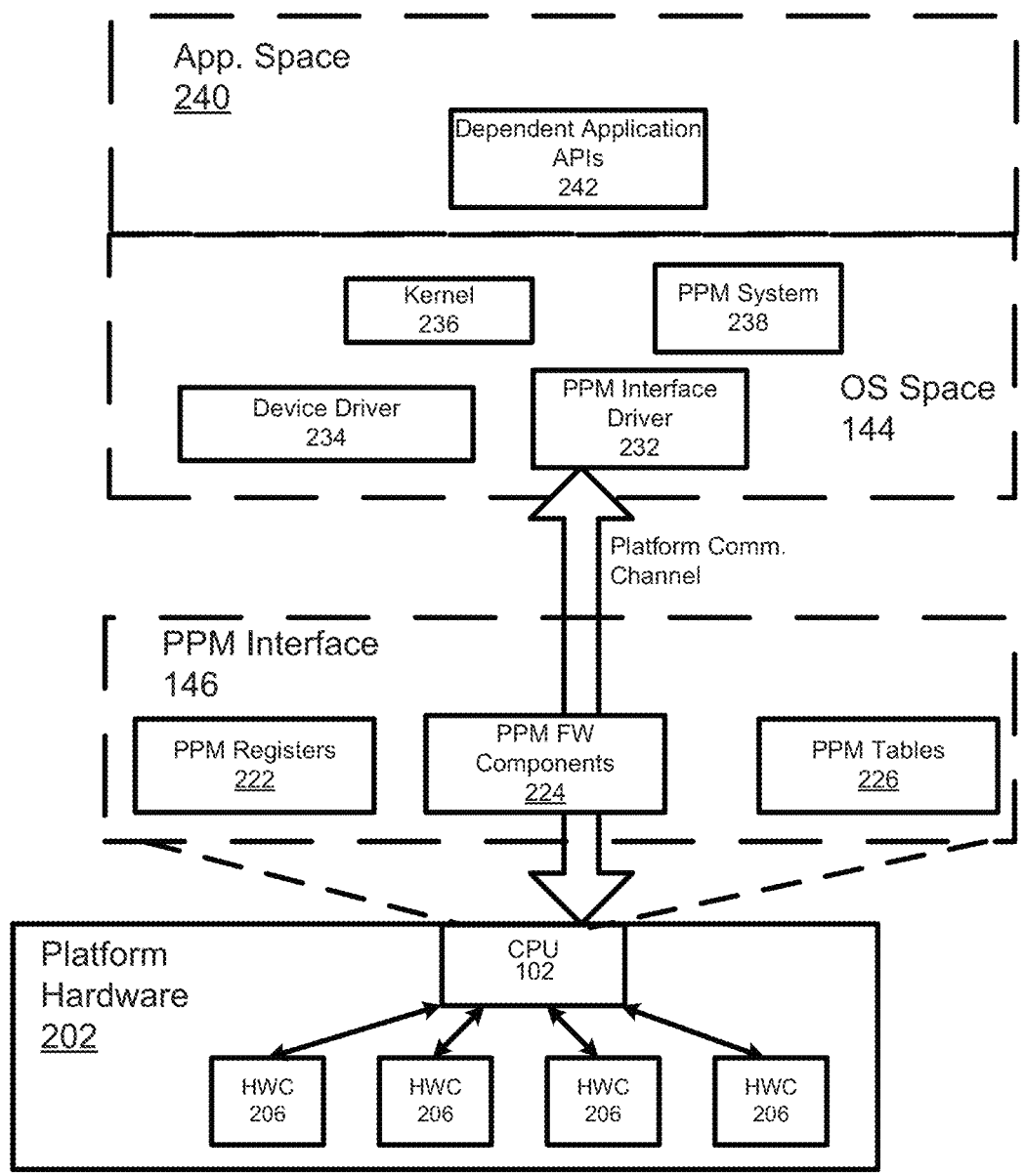
FIG. 2 is a diagram showing an abstracted representation of a PPM interface implemented on a platform in accordance with some embodiments.

FIG. 2 is a block diagram abstractly showing a PPM interface for interfacing between OS power and performance functionality, on the one hand, and platform hardware, on the other hand. (It should be noted that this diagram is drawn from an ACPI specification, which henceforth, is used primarily as an example for conveniently presenting some of the principles taught herein. However, the figure has been abstracted and modified to conform with concepts particular to this disclosure. For example, the more general term: "PPM" is used rather than "ACPI" in some places and instead of "OSPM" within the OS space. It should be appreciated that ACPI is a specific implementation of a PPM interface.)

With pertinence to the present disclosure, platform hardware 202 is shown with CPU 102 and hardware components 206. The hardware components provide error injection functionality in compliance with the utilized PPM interfaced. They may correspond to specific circuits, logic units, controllers, executing software, etc. They are capable of generating an error, by way of the PPM, in response to command and trigger from the OS.

The CPU 102, as discussed above, executes firmware and the OS, thereby establishing the PPM interface 146, OS Space 144, and application space 240. The application space includes APIs 242 for applications to run on the platform. The OS space 144 includes PPM interface driver 232, device drivers 234, an OS kernel 236, and a PPM system 238, which facilitates performance and power management from the OS. In the depicted embodiment, a platform control channel (PCC) is implemented by the PPM interface to communicate between the OS PPM functionality and the PPM hardware features.

The PPM interface 146 comprises PPM registers 222, PPM firmware components 224 and PPM tables 226. The registers 222 may correspond to specific registers, e.g., dedicated PPM registers in the hardware, e.g., within the CPU or as part of a controller such as a baseboard controller, or to virtual registers created in software. They also may be a constrained part of the hardware interface, described (at least in location) by the PPM Tables. ACPI, for example, defines a hardware register interface that an ACM-compatible OS may use to control core power management and performance features of platform hardware, as described in Section 4 of the ACPI 5.0 Specification (the ACPI Hardware Specification).

The PPM firmware components 224 include portions of the firmware corresponding to PPM implementations. Typically, they are used to implement interfaces for sleep, wake, and some restart operations. Pertinent to this disclosure, among other things, they may also include components for defining PPM data structures and tables, including those used for error injection services, and they may also include one or more routines for maintaining and/or updating data and/or addresses in the tables. (Note that some of the ACPI features corresponding to firmware components 224 are described in Section 5.3, "Namespace", of the ACPI 5.0 Specification.

The PPM tables, in general, describe the interfaces to the hardware. Some descriptions limit what can be built. For example, some controls may be embedded in fixed blocks of registers, and the table specifies the address of the register block. Most descriptions allow the hardware to be built in arbitrary ways and can describe arbitrary operation sequences needed to make the hardware function. (For the rest of the disclosure, ACPI tables will be described as examples of suitable PPM table structures. ACPI tables are generally described in Section 5.2 of the ACPI 5.0 Specification. In addition, and pertinent to this disclosure, error injection table structures are described in Section 18 of the ACM 5.0 Specification.)

ACPI tables having "Definition Blocks" can make use of a pseudo-code type of language, the interpretation of which can be performed by the OS. That is, OSPM (corresponds to PPM system 238) includes and uses an interpreter that executes procedures encoded in the pseudo-code language and stored in the ACPI tables containing "Definition Blocks." The pseudo-code language, known as ACPI Machine Language (AML), is a compact, tokenized, abstract type of machine language.

Figure 3:
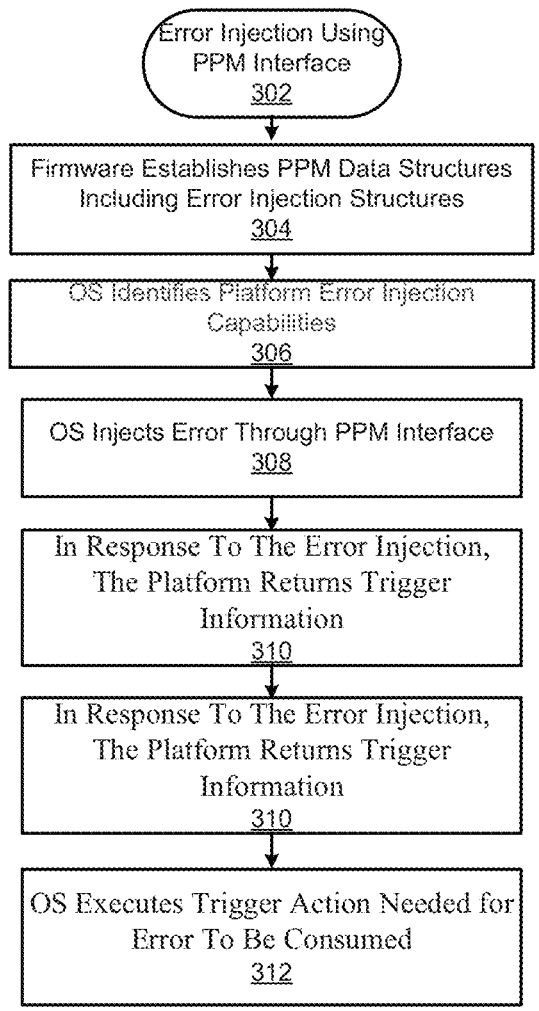
FIG. 3 is a general routine for providing error injection through a PPM interface to a platform OS in accordance with some embodiments.

FIG. 3 shows a routine 302 for processing error injection using a PPM interface.

To give hardware vendors flexibility in choosing their implementation, ACPI uses tables to describe system information, features, and methods for controlling those features. These tables list devices, e.g., devices on the system board or devices that cannot be detected or power managed using some other hardware standard. They also may list system capabilities such as the sleeping power states supported, a description of the power planes and clock sources available in the system, batteries, system indicator lights, and so on. This enables OSPM (PPM system 238 in OS space for ACPI) to control system devices without needing to know how the system controls are implemented.

Figure 4:
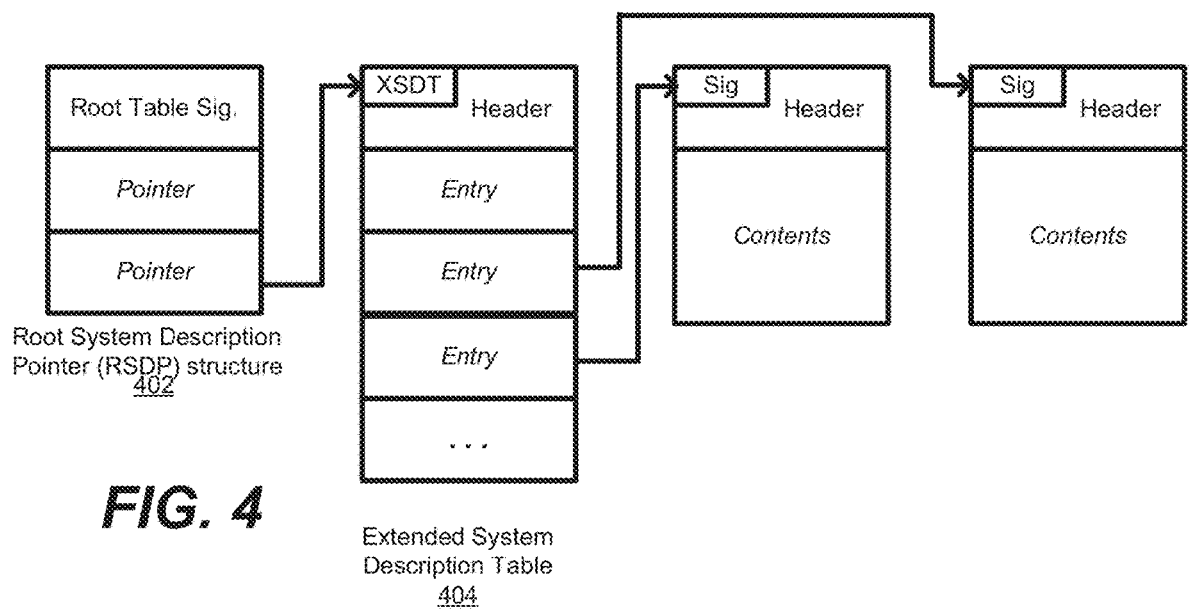
FIG. 4 is a diagram showing a root pointer to a table structure in an ACPI interface in accordance with some embodiments.

FIG. 4 shows a general structure for implementing such tables in accordance with some embodiments. A Root System Description Pointer (RSDP) structure 402 is located in the system's memory address space and may be setup by the platform firmware. This structure contains the address of the Extended System Description Table (XSDT) 404, which references other description tables that provide data to OSPM, supplying it with knowledge of the base system's implementation and configuration.

System description tables should start with identical headers. The primary purpose of the system description tables is to define for OSPM various industry-standard implementation details. Such definitions enable various portions of these implementations to be flexible in hardware requirements and design, yet still provide OSPM with the knowledge it needs to control hardware directly.

OSPM locates that Root System Description Table by following the pointer in the RSDP structure. The RSDT starts with the signature 'RSDT' followed by an array of physical pointers to other system description tables that provide various information on other standards defined on the current system. The OSPM examines each table for a known signature. Based on the signature, OSPM can then interpret the implementation-specific data within the table.

Figure 5:
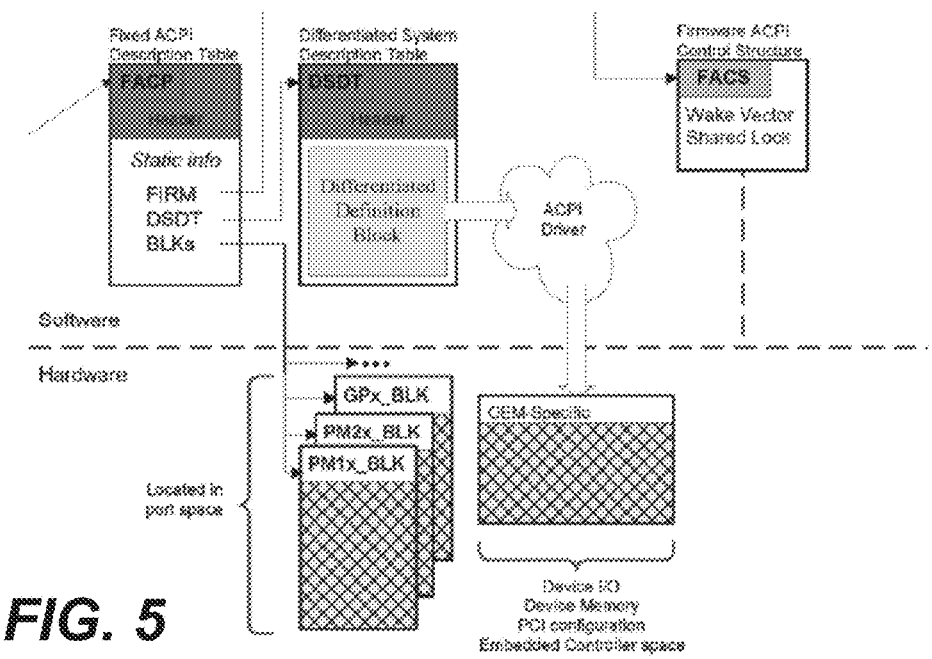
FIG. 5 is a diagram showing a description table structure for an ACPI interface in accordance with some embodiments.

With reference to FIG. 5, the Extended System Description Table (XSDT) is further described. It points to other tables in memory. The first table pointed to by pointer 402, the XSDT points to the Fixed ACPI Description table (FADT). The data within this table includes various fixed-length entries that describe the fixed ACPI features of the hardware. The FADT table refers to the Differentiated System Description Table (DSDT), which contains information and descriptions for various system features. The relationship between these tables is shown in FIG. 5.

When the OS initializes during boot, the OSPM finds the RSDP structure. When the OSPM locates the structure, it looks at the physical address for the Root System Description Table or the Extended System Description Table. The Root System Description Table starts with the signature "RSDT", while the Extended System Description Table starts with the signature "XSDT". These tables contain one or more physical pointers to other system description tables that provide various information about the system. As shown in FIG. 5, there should always be a physical address in the Root System Description Table for the Fixed ACPI Description table (FADT).

When OSPM follows a physical pointer to another table, it examines each table for a known signature. Based on the signature, OSPM can then interpret the implementation-specific data within the description table.

The purpose of the FADT is to define various static system information related to configuration and power management. The Fixed ACPI Description Table starts with the "FACP" signature. The FADT describes the implementation and configuration details of the ACPI hardware registers on the platform.

The GPE0_BLK and GPE1_BLK blocks provide the foundation for an interrupt-processing model for Control Methods. The P_BLK blocks are for controlling processor features. Besides ACPI Hardware Register implementation information, the FADT also contains a physical pointer to a data structure known as the Differentiated System Description Table (DSDT), which is encoded in Definition Block format.

A Definition Block contains information about the platform's hardware implementation details in the form of data objects arranged in a hierarchical (tree-structured) entity known as the "ACPI namespace", which represents the platform's hardware configuration. Definition blocks loaded by OSPM combine to form one namespace that represents the platform. Data objects are encoded in a format known as ACPI Machine Language or AML for short. Data objects encoded in AML are "evaluated" by an OSPM entity known as the AML interpreter. Their values may be static or dynamic. The AML interpreter's dynamic data object evaluation capability includes support for programmatic evaluation, including accessing address spaces (for example, I/O or memory accesses), calculation, and logical evaluation, to determine the result. Dynamic namespace objects are known as "control methods". OSPM "loads" or "unloads" an entire definition block as a logical unit adding to or removing the associated objects from the namespace. The DSDT should be loaded by OSPM at boot time and should not be unloaded. It contains a Definition Block named the Differentiated Definition Block that contains implementation and configuration information OSPM can use to perform power management, thermal management, or Plug and Play functionality that goes beyond the information described by the ACPI hardware registers.

Definition Blocks can either define new system attributes or, in some cases, build on prior definitions. A Definition Block can be loaded from system memory address space. One use of a Definition Block is to describe and distribute platform version changes.

Definition blocks enable wide variations of hardware platform implementations to be described to the ACPI-compatible OS while confining the variations to reasonable boundaries. Definition blocks enable simple platform implementations to be expressed by using a few well-defined object names.

Some operators perform simple functions and others encompass complex functions. The power of the Definition Block comes from its ability to allow these operations to be glued together in numerous ways, to provide functionality to OSPM. The operators present are intended to allow many useful hardware designs to be ACPI-expressed, not to allow all hardware designs to be expressed.

As described in Section 18 of the ACPI 5.0 Specification, ACPI provides ACPI Platform Error Interfaces (APEI), which provide a means for the platform to convey error information to OSPM. APEI extends existing hardware error reporting mechanisms and brings them together as components of a coherent hardware error infrastructure. APEI takes advantage of the additional hardware error information available in today's hardware devices and integrates much more closely with the system firmware.

As a result, APEI may provide the following benefits: (a) it allows for more extensive error data to be made available in a standard error record format for determining the root cause of hardware errors; and (b) it is extensible, so that as hardware vendors add new and better hardware error reporting mechanisms to their devices, APEI allows the platform and the OSPM to gracefully accommodate the new mechanisms.

This provides information to help system designers understand basic issues about hardware errors, the relationship between the firmware and OSPM, and information about error handling and the APEI architecture components.

A hardware error is a recorded event related to a malfunction of a hardware component in a computer platform. The hardware components contain error detection mechanisms that detect when a hardware error condition exists. Hardware errors can be classified as either corrected errors or uncorrected errors.

Both OSPM and system firmware play important roles in hardware error handling. APEI improves the methods by which both of these can contribute to the task of hardware error handling in a complementary fashion. APEI allows the hardware platform vendor to determine whether the firmware or OSPM will own key hardware error resources. APEI also allows the firmware to pass control of hardware error resources to OSPM when appropriate.

APEI includes four separate tables: (a) an Error Record Serialization Table (ERST), (b) a BOOT Error Record Table (BERT), (c) a Hardware Error Source Table (HEST), and with particular pertinence to this disclosure (d) an Error Injection Table (EINJ).

This section outlines an ACPI table mechanism, called EINJ, which allows for a generic interface mechanism through which OSPM can inject hardware errors to the platform without requiring platform specific OSPM level software. The primary goal of this mechanism is to support testing of OSPM error handling stack by enabling the injection of hardware errors. Through this capability OSPM is able to implement a simple interface for diagnostic and validation of error handling on the system.

FIG. 6-15 show the table structure of ACPI error injection. FIG. 6 is a table showing the layout of an Error injection (EINJ) table, and FIG. 7 identifies the supported error injection actions. An EINJ table provides a generic interface mechanism through which OSPM can inject hardware errors to the platform without requiring platform specific OS software. System firmware is responsible for building this table, which is made up of injection instruction entries.

An injection action generally includes a series of one or more injection instructions. An injection instruction represents a primitive operation on an abstracted hardware register, represented by the register region as defined in an injection instruction entry.

FIG. 8 shows the layout of an Injection Instruction entry. An injection instruction entry describes a region in an injection hardware register and the injection instruction to be performed on that region.

A register region is described as a generic address structure. This structure describes the physical address of a register as well as the bit range that corresponds to a desired region of the register. The bit range is defined as the smallest set of consecutive bits that contains every bit in the register that is associated with the injection instruction. For example, if bits [6:5] and bits [3•2] all correspond to an injection Instruction, the bit range for that instruction would be [6:2].

Because a bit range could contain bits that do not pertain to a particular injection instruction (i.e. bit 4 in the example above), a bit mask is used to distinguish all the bits in the region that correspond to the instruction. The Mask field is defined to be this bit mask with a bit set to a '1' for each bit in the bit range (defined by the register region) corresponding to the injection instruction. Note that bit '0' of the hit mask corresponds to the lowest bit in the bit range. In the example used above, the mask would be 11011b or 0x1B.

Reference is made to FIGS. 10-13. FIG. 10 lists injection instructions supported for injection instruction entries. FIG. 11 defines error injection status codes returned from GET COMMAND STATUS. FIG. 12 defines error type codes returned from GET_ERROR_TYPE. FIG. 13 is a table showing a SET_ERROR_TYPE_WITH_ADDRESS data structure.

Error injection operation can be a two step process where the error is injected into the platform and subsequently triggered. After software injects an error into the platform using SET ERROR_TYPE action, it should trigger the error. In order to trigger the error, the software invokes GET_TRIGGER_ERROR_ACTION_TABLE action, which returns a pointer to a Trigger Error Action table. The format of the table is as shown in the table of FIG. 15. Software executes the instruction entries specified in the Trigger Error Action table (FIG. 15) in order to trigger the injected error. (Note: If the "Entry Count" field above is ZERO, then there are no action structures in the TRIGGER_ERROR action table. The platform may make this field ZERO in situations where there is no need for a TRIGGER_ERROR action, for example, in cases where the error injection action seeds as well as consumes the error. Note also that the format of TRIGGER_ERROR Instruction Entries is the same as Injection Instruction entries as described in the table of FIG. 10.

Before an OSPM can use this mechanism to inject errors. It should discover the error injection capabilities of the platform by executing a GET_ERROR_TYPE command. (See FIG. 12 for definitions of error types).

After discovering the error injection capabilities, OSPM can inject and trigger an error according to the sequence described below. (Note that injecting an error into the platform does not automatically consume the error. In response to an error injection, the platform returns a trigger error action table. The software that injected the error should then execute the actions in the trigger error action table in order to consume the error. If a specific error type is such that it is automatically consumed on injection, the platform will return a trigger error action table comprising a NO_OP instruction.

The following is a process sequence for errors to be injected by an OS (e.g., OSPM):

1. Executes a BEGIN_INJECTION_OPERATION action to notify the platform that an error injection operation is beginning.

2. Executes a GET ERROR TYPE action to determine the error injection capabilities of the system. This action returns a DWORD bit map of the error types supported by the platform. (See FIG. 12 for definitions of error types.)

3. If GET_ERROR TYPE returns the DWORD with BIT31 set, it means that vendor defined error types are present, apart from the standard error types defined in the table of FIG. 12.

4. OSPM chooses the type of error to inject.

4.1 If the OSPM chooses to inject one of the supported standard error types, then it sets the corresponding bit in the "Error Type" field (see FIG. 13), by executing a SET_ERROR_TYPE_WITH_ADDRESS command. For example, if the OSPM chooses to inject "Memory Connectable" error, then the OSPM executes SET_ERROR TYPE_WITH_ADDRESS with an "Error Type" value of 0x0000_0080.

4.1.1 Optionally, the OSPM can choose the target of the injection, such as a memory range, PCIe Segment/Device/Function or Processor APIC ID, depending on the type of error. The OSPM does this by filling in the appropriate fields of the "SET ERROR TYPE WITH ADDRESS data structure. (See FIG. 13 for details).

4.2 If the OSPM chooses to inject one of the vendor defined error types, then it executes SET_ERROR_TYPE_WITH_ADDRESS with BIT31 of "Error Type" field set.

4.2.1 OSPM gets the location of the "Vendor Error Type Extension Structure", by reading the "Vendor Error Type Extension Structure Object" (sec FIG. 14).

4.2.1.1 OSPM reads the Vendor ID, Device ID and Rev ID from the PCIe config. space, whose path (PCIe Segment/Device/Function) is provided in the "SBDF" field of the Vendor Error Type Extension Structure.

4.2.1.2 If the Vendor ID/Device ID and Rev IDs match, then the OSPM can identify the platform it IS running on and would know", the Vendor error types that are supported by this platform.

4.2.1.3 The OSPM writes the vendor error type to inject in the "OEM Defined Structure" field. (See FIG. 14).

4.2.2 Optionally, the OSPM can choose the target of the injection, such as a memory range, Pat Segment/Device/Function or Processor APIC ID, depending on the type of error. The OSPM does this by filling in the appropriate fields of the "SET_ERROR_TYPE_WITH_ADDRESS Data structure". (Sec FIG. 13 for details 5. Executes an EXECUTE_OPERATION action to instruct the platform to begin injection operation.

6. Busy waits by continually executing CHECK BUSY_STATUS action until the platform indicates that the operation is complete by clearing the abstracted Busy bit.

7. Executes a GET COMMAND STATUS action to determine the status of the read operation.

8. If the status indicates that the platform cannot inject errors, stop.

9. Executes a GET_TRIGGER_ERROR_ACTION_TABLE operation to get the physical pointer
to the TRIGGER ERROR action table. This provides the flexibility in systems where injecting an error is a two (or more) step process.

10. Executes the actions specified in the TRIGGER ERROR action table.

11. Execute an END_OPERATION to notify the platform that the error injection operation is complete.

The invention is not limited to the embodiments described, but can be practiced with modification and alteration within the spirit and scope of the appended claims. It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme.

What is claimed is:

1. A system comprising:
   a platform hardware component; and
   a processor to execute an operating system (OS), wherein the OS is to:
   execute a first action to determine error injection capabilities of the platform hardware component;
   receive a response that is to indicate that the platform hardware component supports a plurality of standard error types and a vendor defined error type;
   select, for injection, a first error type from among the plurality of standard error types and the vendor defined error type; and
   execute a second action to instruct the platform hardware component to begin an error injection operation using the first error type.

2. The system of claim 1, wherein the OS is to:
   in response to the first error type selected by the OS being the vendor defined error type, access a Vendor Error Type Extension Structure.

3. The system of claim 2, wherein the OS is to:
   in response to the Vendor Error Type Extension Structure being accessed, read a Vendor ID, a Device ID, and a Rev ID.

4. The system of claim 3, wherein the OS is to:
   in response to the Vendor ID, the Device ID, and the Rev ID being read, identify the platform hardware component.

5. The system of claim 3, wherein the OS is to:
   in response to the Vendor ID, the Device ID, and the Rev ID being read, identify the vendor defined error type.

6. The system of claim 1, wherein the OS is to:
   in response to the second action being executed to instruct the platform hardware component to begin the error injection operation, continually execute a third action until the platform hardware component is to clear a busy bit in a flag to indicate that the error injection operation is complete.

7. The system of claim 6, wherein the third action comprises a CHECK_BUSY_STATUS action.

8. The system of claim 1, wherein the OS is to:
   execute a fourth action to determine a status of the error injection operation; and
   in response to an indication that the platform hardware component is unable to inject error, stop the error injection operation.

9. The system of claim 8, wherein the fourth action comprises a GET_COMMAND_STATUS action.

10. The system of claim 1, wherein the OS is to:
    execute a fifth action to get a physical pointer to an action table;
    access the action table; and
    execute one or more actions specified in the action table.

11. The system of claim 10, wherein the fifth action comprises a GET_TRIGGER_ERROR_ACTION_TABLE action.

12. The system of claim 1, wherein the OS is to:
    in response to a selection of the first error type, select a target for the injection.

13. The system of claim 12, wherein the OS is to:
    select the target for the injection from among a memory range, a Peripheral Component Interconnect Express (PCIe) segment, a device, a function, or a processor.

14. The system of claim 1, wherein the OS is to:
    execute a sixth action to notify the platform hardware component that the error injection operation is complete.

15. The system of claim 14, wherein the sixth action comprises END_OPERATION action.

16. The system of claim 1, wherein:
    the first action comprises a GET_ERROR_TYPE action;
    the second action comprises an EXECUTE_OPERATION action; and
    the response comprises a DWORD response.

17. An apparatus comprising:
    a processor; and
    a platform component configured to communicate with an operating system (OS), wherein the platform component is to:
    receive a GET_ERROR_TYPE action from the OS that requests error injection capabilities of the platform component;
    transmit a DWORD response to the OS, the DWORD response including a bit map that identifies (i) a plurality of standard error types supported by the platform component and (ii) a vendor defined error type supported by the platform component, wherein the OS selects, for injection, a first error type from among the plurality of standard error types and the vendor defined error type; and
    receive an EXECUTE_OPERATION action from the OS that instructs the platform component to begin an error injection operation using the first error type.

18. The apparatus of claim 17, wherein the platform component is to:
    clear an abstracted busy bit to indicate that the error injection operation is complete.

19. The apparatus of claim 17, wherein the platform component is to:
    receive, from the OS, a GET_COMMAND_STATUS that requests a status of the error injection operation.

20. The apparatus of claim 17, wherein the platform component is to:
    in response to the platform component being unable to inject errors, transmit, to the OS, a status report that is to indicate that the platform component is unable to inject errors.

21. An apparatus comprising:
    a memory; and
    a processor to execute an operating system (OS), wherein the OS is to:
    execute a GET_ERROR_TYPE action to determine error injection capabilities of a platform component,
    receive a DWORD response from the platform component, wherein a first bit of the DWORD is set to indicate that the platform component supports (i) a plurality of standard error types and (ii) a vendor defined error type, select, for injection, a first error type from among the plurality of standard error types and the vendor defined error type, and execute a EXECUTE_OPERATION action to instruct the platform component to begin an error injection operation using the first error type.

22. The apparatus of claim 21, wherein the OS is further configured to:

in response to the first error type selected by the OS being the vendor defined error type, access a Vendor Error Type Extension Structure to read a Vendor ID, a Device ID and a Rev ID; and in response to the Vendor ID, the Device ID and the Rev ID being read, identify the platform component and the vendor defined error type.

23. The apparatus of claim 21, wherein the OS is further configured to:

in response to the EXECUTE_OPERATION action being executed, continually execute a CHECK_BUSY_STATUS action until the platform component indicates that the error injection operation is complete by clearing a busy bit in a flag.

24. The apparatus of claim 21, wherein the OS is further configured to:

execute a GET_COMMAND_STATUS action to determine a status of the error injection operation; and in response to an indication that the platform component is unable to inject error, stop the error injection operation.

25. The apparatus of claim 21, wherein the OS is to:

execute a GET_TRIGGER_ERROR_ACTION_TABLE operation to get a physical pointer to a TRIGGER_ERROR action table;

access the TRIGGER_ERROR action table; and execute one or more actions specified in the TRIGGER_ERROR action table.

* * * * *